US006472053B1

(12) United States Patent
Hoshino et al.

(10) Patent No.: US 6,472,053 B1
(45) Date of Patent: Oct. 29, 2002

(54) INK JET RECORDING SHEET

(75) Inventors: Mitsuhide Hoshino; Satoshi Kuwabara; Fumiko Ito; Norio Yabe, all of Higashi-Matsuyama (JP)

(73) Assignee: Nippon Paper Industries Co., Ltd., Tokyo (JP)

( * ) Notice: Subject to any disclaimer, the term of this patent is extended or adjusted under 35 U.S.C. 154(b) by 0 days.

(21) Appl. No.: 09/413,756

(22) Filed: Oct. 6, 1999

(30) Foreign Application Priority Data

Oct. 7, 1998 (JP) .......................................... 10-284936
Oct. 8, 1998 (JP) .......................................... 10-286421

(51) Int. Cl.[7] ............................ B32B 27/14; B32B 3/00
(52) U.S. Cl. ........................ 428/195; 428/212; 427/152
(58) Field of Search ................................ 425/195, 206, 425/219, 220, 323, 304.4, 325, 329, 340, 341, 480, 500, 688

(56) References Cited

U.S. PATENT DOCUMENTS 5,576,088 A * 11/1996 Ogawa et al. .............. 428/327

FOREIGN PATENT DOCUMENTS

| | | | |
|---|---|---|---|
| EP | 0705710 | | 4/1996 |
| EP | 0707977 | | 4/1996 |
| EP | 0781666 | | 7/1997 |
| JP | 07-89216 | * | 4/1995 |

* cited by examiner

*Primary Examiner*—Cynthia H. Kelly
*Assistant Examiner*—B. Shewareged
(74) *Attorney, Agent, or Firm*—Millen, White, Zelano & Branigan, P.C.

(57) ABSTRACT

An ink jet recording sheet having on a support a first porous ink-receiving layer comprising inorganic fine particles and a binder resin and, on the first ink-receiving layer, a second ink-receiving layer comprising a resin capable of forming a glossy layer; wherein the fine pigment particles have an average particle size of from 10 to 500 nm, the first ink-receiving layer has a coverage of from 5 to 50 $g/m^2$ on a dry solids basis, and the second ink-receiving layer has a coverage of from 0.1 to 2.0 $g/m^2$ on a dry solids basis and a 60° specular glossiness of at least 60% at the surface; and, if desired, wherein either the first or the second ink-receiving layer can have a specular surface by undergoing a surface treatment such as calendering.

23 Claims, No Drawings

INK JET RECORDING SHEET

FIELD OF THE INVENTION

The present invention relates to an ink jet recording material which can meet basic requirements for characteristics of a recording material, including high ink absorbency, vivid ink coloration and excellent keeping quality. More particularly, the invention concerns an ink jet recording sheet having high surface gloss, causing only a slight drop in gloss by recording and enabling the recording of high-grade images. Further, the invention relates to a method of effectively ensuring satisfactorily high surface gloss for the ink jet recording sheet having excellent properties as mentioned above.

BACKGROUND OF THE INVENTION

The ink jet recording is an art of jetting out fine ink drops on any of various working principles and making them adhere to a recording material, such as a recording paper, to record pictures and letters. This art enables a recording apparatus to be operated at a high speed and with a low noise and to easily form full color images, and further requires no processing with chemicals, such as development and fixation. Therefore, the use of ink jet recording systems has been spreading rapidly.

Moreover, the use of multicolor ink jet recording arts enables the formation of high-grade color images comparable to the images formed by multicolor graphic arts utilizing plate-making processes or those formed by color photography, and that at a low price in the case of printing a small number of copies. In recent years, therefore, the ink jet recording arts have come to be also utilized in the field of recording full-color images.

For the purpose of making it possible to use woodfree paper and coated paper, which are generally used for graphic arts and note-taking, as recording materials in the ink jet recording art, examinations of recording apparatus and ink composition have so far been made from various aspects. On the other hand, recent remarkable improvements in performance of ink jet recording apparatus, as seen from substantial increases in recording speed and definition and/or the achievement of full-color recording, have expanded the potential of ink jet recording arts, and thereby new uses have been created. Such progress in the recording apparatus side has come to require ink jet recording materials to have higher-grade recording suitability. Thus, higher levels of qualities than usual have come to be requested for recording materials.

In addition to the conventional two requirements, one being excellent image quality and the other no gloss decrease in the image-recorded area, the recording suitability enabling the recording of images with high-grade quality equivalent to that of color photographic paper is required for ink jet recording materials nowadays. In order to meet such a new requirement, it is necessary to confer higher gloss than ever on the surface of ink jet recording material itself and to ensure the glossiness equivalent to that of photographic paper surface in both the background and image-recorded areas. These qualities required for recorded images are expressed plainly in a phrase "photographic style quality", and widely known now.

The properties the recording material is required to have include (i) ensuring a high density, a circular form and coloration with a bright-and-vivid tone in individual ink dots constituting the images recorded on the recording material, (ii) enabling high-speed drying of ink to cause neither running nor blurring of the ink even when a plurality of ink dots are overlapped on the recording material surface, and (iii) enabling moderate diffusion of ink dots in the horizontal direction and ensuring a smooth and clear circumference in the individual ink dots.

Moreover, it becomes an important factor in forming images of high-grade quality that the recording material has high surface gloss and causes only a slight gloss decrease in the image-recorded area to keep gloss comparable with that in the background area after recording also.

However, the glossiness of ink jet recording paper is generally low in the image-recorded area, compared with in the background area. This phenomenon is supposed to occur with a cause that, simultaneously with the absorption of ink adhering to the recording paper surface, the resin and the pigment contained in the ink-receiving layer of recording paper dissolve or swell in the ink and therefrom the surface structure of the recording paper collapses.

In order to solve these problems, some proposals as mentioned below have so far been offered.

As examples of means to provide excellent image quality, the ink jet recording paper prepared by applying a coating color for surface conversion to a low-sized base paper is disclosed in Japanese Tokkai Sho 52-53012 (the term "Tokkai" as used herein means an "unexamined published patent application"), and the ink jet recording paper prepared by impregnating a paper sheet containing therein urea-formaldehyde resin particles with a water-soluble resin is disclosed in Japanese Tokkai Sho 53-49113. These ink jet recording papers of plain paper type can absorb ink quickly, but have a disadvantage in that the ink dots put thereon are liable to be blurred in their circumferences and suffer from a decrease in dot density.

In addition, the ink jet recording paper having on a support surface a coated layer with high ink absorbency is disclosed in Japanese Tokkai Sho 55-5830, and the case wherein the silica powder is used as a filler in the coated layer is disclosed in Japanese Tokkai Sho 55-51581. These ink jet recording papers of coated paper type have improvements in the size, shape, density and color-tone reproduction of ink dots adhering thereto over those of plain paper type.

As to the ink used for those ink jet recording papers, on the other hand, the water-based ink using water-soluble dyes prevails at present. When the images formed on the recording paper get wet as occasionally happens, therefore, the dyes in the image-recorded area are dissolved again to ooze out to the paper surface; as a result, the value as recorded matter is seriously damaged. In other words, such recording papers have a problem of being poor in water resistance.

In another case where the ink-receiving layer contains a large amount of water-soluble resin, the ink jet recording paper has a defect that the resin swells or dissolves upon contact with water-based ink to lower the gloss in the recorded area (the area brought into contact with the ink) in contrast to the background area.

For the purpose of mitigating those drawbacks, the improvement in water resistance of the recording paper by incorporating porous cationic hydrated aluminum oxide particles into an ink-receiving layer has been proposed in Japanese Tokko Hei 3-24906 (the term "Tokko" as used herein means an "examined patent publication"). This proposal directs its attention to the porosity of cationic hydrated aluminum oxide. More specifically, the liquid substances, such as ink and water, enter into pores and are confined thereto; as a result, it becomes very difficult for the ink to cause the swelling and the dissolution in the ink-receiving layer and thereby the decrease of glossiness in the image-recorded area is checked.

Although the proposal mentioned above enabled the production of ink jet recording paper satisfying the two requirements of ensuring excellent image quality and causing no gloss decrease in the image-recorded area, it cannot ensure for the ink jet recording paper sufficiently high surface gloss after recording.

As means to produce ink jet recording paper having satisfactorily high surface gloss after recording, there are known a method of using a calender wherein ink jet recording paper is passed between a hot steel roll and an elastic roll as the pressure is applied thereto, and a cast coating method wherein the ink-receiving layer in a wet condition is pressed against the specular surface of a hot drum and dried as it is (as disclosed, e.g., in JP-A-6-79967).

To mention in detail, the calendering known as a general art of surface treatment is a method of passing a paper sheet through the nip between a hot steel roll with a specular surface and an elastic roll to produce its treatment effect upon the sheet surface brought into contact with the steel roll. This art is used in the final finishing step for improving paper quality to make the uneven surface of paper uniform and smooth, thereby imparting high-quality gloss to the paper surface.

While the ink jet recording paper having an ink receiving layer formed by directly coating a porous inorganic pigment in a secondary-particle state (e.g., hydrated aluminum oxide particles prepared by subjecting alumina hydrogel slurry successively to filtration, compression, drying, grinding and screening (Japanese Tokko Hei 3-24906), and amorphous silica) together with binder on a support can acquire highly glossy surface by undergoing the calendering treatment mentioned above, this treatment crushes the pores formed by inorganic fine particles to lower the ink absorbency.

More specifically, when the ink jet recording paper provided with an ink receiving layer comprising porous inorganic pigment in a secondary-particle state undergoes calendering treatment as the final finishing, the coated layer on a paper sheet is smoothened by high nip pressure between rolls to acquire high surface gloss, but the nip pressure between rolls decreases the voids inside the ink receiving layer, thereby causing a drop in ink absorbing capacity. Therefore, the calendering treatment as final finishing has been considered to be generally unsuitable for ink jet recording paper.

In using the cast coating method, on the other hand, there are many restrictions, e.g., on the viscosity and the solids concentration of a coating color for the ink-receiving layer. Those restrictions are attributable to the properties of hydrated alumina particles, such as alumina sol, used in the coating color. In addition, it is difficult to increase the coverage of coating color to form a thick ink-receiving layer. This is because the hydrated alumina particles, such as alumina sol, causes an extreme increase in viscosity by a rise of solids concentration in the coating color to mar the coating suitability. Therefore, sufficient ink absorbency cannot be secured by the formation of a thick ink-receiving layer; as a result, good image quality cannot be achieved.

The photographic paper has very high surface gloss, and the 60° specular glossiness at the surface thereof is of the order of 95%. If such high gloss is conferred on the ink jet recording paper, it becomes possible to obtain high-grade recording paper. However, the fact is in that it was difficult to confer 60° specular glossiness higher than that of photographic paper upon ink jet recording paper.

SUMMARY OF THE INVENTION

Therefore, the present inventors have made careful examination of the surface glossiness required for conferring high-grade appearance upon an ink jet recording material. As a result thereof, it has turned out that the ink jet recording material can have high-grade appearance comparable to that of photographic paper from the sensory point of view so far as the 60° specular glossiness thereof is at least 60%.

Further, as a result of our intensive study on the formation of a thick recording layer having high porosity, high gloss and high ink absorbency, it has been found that good results can be obtained by providing on a support a recording layer constituted of a porous first layer and a second layer so that the 60° specular glossiness of at least 60% is imparted to the second layer surface as the porosity of the first layer is retained, thereby achieving the invention.

Our further study aiming at the achievement of both high porosity and higher glossiness in an ink jet recording layer has discovered that, when the recording layer has a porous double-layer structure, the pigment particles used in the first porous layer is not secondary particles but primary particles having an average particle size of 10–500 nm and the upper porous layer is constituted mainly of resin capable of forming a glossy layer, the pores formed inside the recording layer are not collapsed even by calendering treatment; as a result, satisfactorily high glossiness can be imparted to the recording layer by calendering as the high porosity of the recording layer is retained.

Therefore, an object of the invention is to provide an ink jet recording material which can ensure high surface gloss in both background (unrecorded) and image-recorded areas to record thereon high-grade images comparable to those of color photographic paper.

Another object of the invention is to provide a method of further improving the surface glossiness of an ink receiving layer to produce an ink jet recording sheet capable of providing high-grade images equivalent or superior to those of color photographic paper.

The former object of the invention is attained with an ink jet recording sheet having on a sheet support a first porous ink-receiving layer comprising inorganic fine particles and a binder resin and, on the first ink-receiving layer, a second ink-receiving layer comprising a resin capable of forming a glossy layer; wherein the fine pigment particles have an average particle size of from 10 to 500 nm, the first ink-receiving layer has a dry coverage of from 5 to 50 $g/m^2$, and the second ink-receiving layer is porous to an extent that it does not entirely block up the pores in the surface part of the first ink-receiving layer and has a dry coverage of from 0.1 to 2.0 $g/m^2$ and a 60° specular glossiness of at least 60% at the surface.

In a preferred embodiment of the present invention, the pore radius in the first ink-receiving layer is from 1 to 500 nm and the average pore radius is not greater than 100 nm, and moreover the second ink-receiving layer has a structure porous to an extent that it does not entirely block up the pores in the surface part of the first ink-receiving layer.

The latter object of the invention is attained with a method of producing an ink jet recording sheet, which comprises providing on a sheet support a first porous ink-receiving layer comprising inorganic fine particles having an average particle size of from 10 to 500 nm and a binding resin at a dry coverage of 5 to 50 $g/m^2$, and providing on the first ink-receiving layer a second porous ink-receiving layer comprising resin capable of forming a glossy layer at a dry coverage of 0.1 to 2 $g/m^2$; wherein the first ink-receiving layer provided on the support or the second ink-receiving layer provided on the first ink-receiving layer is passed through the nip between two heated and/or pressure-applied rolls either of which has a specular surface as the surface of the ink-receiving layer is brought into contact with the specular surface of the roll.

DETAILED DESCRIPTION OF THE INVENTION

The support used in the invention may be any of known supports capable of imparting sufficient strength to ink jet recording sheet. Specifically, various support materials, including paper, plastic films (e.g., polyethylene, polypropylene and polyethylene terephthalate films), paper plastered with resin film, and paper processed with fused resin, or the so-called laminated paper, can be used.

Of these materials, the support particularly preferred in the invention is paper. Examples of usable paper include base paper which is made from paper stock comprising chemical pulp (e.g., LBKP and NBKP), mechanical pulp (e.g., GP, PGW, TMP and CMP) or waste paper pulp (e.g., DIP) and a starch material as main components and further as additives a binder, a sizing agent, a fixing agent and a paper strength increasing agent by the use of any of various paper machines, and paper prepared by subjecting base paper to treatment well-known in the papermaking field, e.g., size press coating, coating color application (as in the case of coated paper, art paper or cast-coated paper) or calendering treatment.

The inorganic fine particles used in the first ink-receiving layer provided on the support are inorganic particles having an average particle size of 10 to 500 nm and enabling the formation of a porous layer when the coating composition containing them is applied to the support and then dried. For instance, the fine metal oxide particles which are dispersed as colloidal particles in solvents, that is, metal oxide sol (such as silica sol, alumina sol, zirconia sol or titania sol), can be used. In particular, it is advantageous to use alumina sol containing hydrated alumia particles of boehmite, which has an average particle size of from 10 to 500 nm and shows a pH value in the range of 2 to 6 when it has a solid concentration of 15 to 30 weight %.

Such alumina sol can be prepared according to the method of adding an acid, such as hydrochloric acid or acetic acid, to the slurry containing hydrated alumina produced by hydrolyzing an aluminum alkoxide, such as aluminum propoxide, or deflocculating hydrated alumina slurry by means of ultrasonic waves (as disclosed, e.g., in Japanese Tokkai Hei 3-275510, Japanese Tokkai Hei 3-281384, Japanese Tokkai Hei 3-285814, Japanese Tokkai Hei 3-285815, Japanese Tokkai Hei 4-275917, Japanese Tokkai Hei 5-24823, Japanese Tokkai Hei 5-24824, Japanese Tokkai Hei 5-32413, Japanese Tokkai Hei 6-64918, Japanese Tokkai Hei 6-64919, Japanese Tokkai Hei 7-291621, Japanese Tokkai Hei 8-295509 and Japanese Tokkai Hei 8-333115).

As to the pores formed among inorganic fine particles in the first ink-receiving layer, it is desirable that their size be as small as possible within the limit of no hindrance to ink absorbency. If the inorganic fine particles used form pores having a large radium of, e.g., 3 $\mu$m in the first ink-receiving layer, the first ink-receiving layer rapidly absorbs a coating composition applied for forming the second ink-receiving layer; as a result, the resin component in the coating composition cannot remain on the first ink-receiving layer to fail in forming the second ink-receiving layer, let alone providing glossy surface.

If the radii of pores formed in the first ink-receiving layer are therefore made small, the absorption of a coating composition for the second ink-receiving layer into the first ink-receiving layer is retarded, and thereby a large part of the resin component in the composition remains on the first ink-receiving layer. If the composition coated is dried while the resin remains on the first ink-receiving layer, the second ink-receiving layer having a glossy surface can be formed. Accordingly, it is especially desirable for the invention that the radii of pores formed among inorganic fine particles be within the range of 1 to 500 nm and the average pore radius be 100 nm or below. This is because the presence of pores with radii greater than 500 nm in the first ink-receiving layer enables a coating composition for the second ink-receiving layer to be absorbed rapidly into the first ink-receiving layer; as a result, the resin component in the composition cannot stay on the first ink-receiving layer to fail in forming a layer with glossy surface. When the radii of pores formed are smaller than 1 nm, on the other hand, satisfactory ink absorbency cannot be achieved.

In other words, when the radii of pores formed in the first ink-receiving layer are from 1 to 500 nm, the absorption of a coating composition applied for forming the second ink-receiving layer into the first ink-receiving layer is retarded properly, and thereby a large part of the resin component in the composition remains on the first ink-receiving layer. By drying the composition coated while the resin remains on the first ink-receiving layer, therefore, the second ink-receiving layer having a glossy surface can be formed.

The binder resin used for the first ink-receiving layer can be selected properly from known resins which can be mixed with the inorganic fine particles as recited above, or oxide sol, and can form films when coated on support and dried. From the viewpoint of enhancing ink absorbency, it is desirable to use water-soluble resins, such as polyvinyl alcohol, polyvinyl pyrrolidone and water-soluble cellulose, and/or water-dispersible resins (polymer latices), such as conjugate diene polymers (e.g., styrene-butadine copolymer), acrylic polymers, and vinyl polymers (e.g., ethylene-vinyl acetate copolymer).

The suitable ratio of inorganic fine particles to binder resin is from 97/3 to 70/30 by weight on a dry solids basis. When the proportion of inorganic fine particles in the first ink-receiving layer is greater than 97% by weight, the coated layer becomes brittle after drying, and easily comes off the support to induce a powder fall phenomenon. On the other hand, when the proportion of inorganic fine particles in the first ink-receiving layer is smaller than 70% by weight, the absorption of ink into the ink-receiving layer becomes poor. In particular, it is advantageous to the present first ink-receiving layer that the inorganic fine particles/binder resin ratio be from 95/5 to 85/15 by weight.

As standards of ink absorbing quality, the extent of blur of ink on the image-area border and that of beading phenomenon occurring upon ink jet recording are adopted. The blur on the border is a phenomenon that the border between two neighboring solid image areas recorded in ink of different colors is vague. Therein, either monochromatic ink alone or ink mixture of two or more different colors may constitute the color of each solid image area. The term beading means a phenomenon that mottled or striped shades are observed in not only solid image area but also recorded images as a whole.

Both the phenomena are caused by ink drops remaining in part on the ink-receiving layer surface without being uniformly absorbed into the recording sheet when they are jetted onto the recording sheet from ink nozzles of an ink jet recording apparatus. More specifically, the blur on the border signifies a phenomenon that the recording sheet cannot absorb all the ink drops continuously jetted thereto to cause an overflow of a part of ink drops from their recording area into adjacent recorded-image area, and thereby to make the border of recorded-image areas indistinguishable. On the other hand, the beading signifies a phenomenon that, although the recording sheet is not so inferior in ink absorbency as it causes blur on the border, the ink drops continuously jetted to the recording sheet are linked together before they are entirely absorbed into the ink-receiving layer to give uneven density the recorded image.

When the ink absorbency of recording sheet is poor, these blurred border and beading phenomena occur considerably.

Additionally, the coating composition for the first ink-receiving layer may contain various additives, such as a pigment dispersing agent, a coupling agent, a gelling agent, a thickener, a leveling agent, an antifoaming or defoaming agent, a surfactant, a brightening agent, a coloring dye, a fixing agent, an antioxidant, a UV absorbent and a waterproof agent, if desired.

The coverage of the first ink-receiving layer is an important factor deciding the suitability for ink jet recording. When the alumina fine particles are used in the first ink-receiving layer, this alumina layer can absorb the water or alcohol as the solvent of recording ink, and moreover can fix (hold) dyes as the coloring component of the ink.

Further, as the first ink-receiving layer is highly transparent even when it is formed into a relatively thick film, the dyes recorded therein according to the ink jet recording technique can be seen clearly to give very good coloring to the recorded images. For ensuring the ink jet recording suitability (including ink absorbency and coloring properties) in the present recording sheet, it is desirable that the coverage of the first ink-receiving layer be from 5 to 50 $g/m^2$, preferably 20 to 50 $g/m^2$, on a dry solids basis. When the calendering treatment is carried out with the intention of imparting higher gloss to the recording layer surface, it is advantageous that the coverage of the first ink-receiving layer be from 20 to 50 $g/m^2$ on a dry solids basis.

This is because the coverage of the first ink-receiving layer lower than 20 $g/m^2$ on a dry solids basis causes a considerable reduction in the voids of the first ink-receiving layer when the pressure is applied thereto by the passage through the nip between rolls to make the ink absorbency insufficient; while the coverage higher than 50 $g/m^2$ on a dry solids basis causes cracks in the ink-receiving layer upon the passage under pressure to lower the recorded image quality.

From the viewpoints of causing no hindrance to the ink absorbency and ensuring excellent characteristics of the first ink-receiving layer, it is desirable that second ink-receiving layer have a porous structure. When the second ink-receiving layer is formed as a layer having a porous structure, but not a continuous uniform dry film, it does not completely block up the pores formed at the surface of the first ink-receiving layer; as a result, the recording sheet can secure high ink absorbency. In a case where the second ink-receiving layer is a continuous uniform dry film, the film blocks up pores formed at the surface of the first ink-receiving layer to cause a considerable decrease in ink absorbency. The porous structure of the second ink-receiving layer can be observed under an electron microscope or the like.

For attaining two aims of the present invention, namely ensuring high-grade image quality for ink jet recording sheet and giving high gloss and high-grade feeling to the recording sheet surface, it is desirable that the coverage of the second ink-receiving layer be from 0.1 to 2.0 $g/m^2$, preferably from 0.1 to 1.0 $g/m^2$, on a dry solids basis.

When the second ink-receiving layer has a coverage less than 0.1 $g/m^2$ on a dry solids basis, almost all the coating composition applied is absorbed into the first ink-receiving layer before it is dried. Therefore, improvement in surface gloss cannot be achieved, though good ink absorbency and recorded images of good quality can be obtained. When the coverage of the second ink-receiving layer is greater than 2.0 $g/m^2$on a dry solids basis, on the other hand, the layer formed can have high surface gloss, but it is difficult to give a porous structure to such a thick layer, resulting in the formation of a continuous uniform dry film. Thus, the second ink-receiving layer blocks up the pores at the surface of the first ink-receiving layer to form a barrier to recording ink, and thereby the absorption of ink into the first ink-receiving layer is hindered to make it impossible to achieve excellent recorded-image quality.

The resins used for the second ink-receiving layer may be any of materials capable of forming a layer with high surface gloss and ink absorbency (permeability). Suitable examples of such materials include polyvinyl alcohol, polyvinyl pyrrolidone, water-soluble cellulose, acrylic resin, polyacrylamide, polyester, cellulose acetate, acetal resin, melamine resin, urea resin, polyvinyl acetate, ethylene-vinyl acetate copolymer and polystyrene. Of these resins, polyvinyl alcohol, polyvinyl pyrrolidone, water-soluble cellulose, polyester, cellulose acetate, acetal resin and colloidal silica-combined styrene-acrylic copolymer resin are used to particular advantage. These resins may be used alone or as a mixture of two or more thereof.

By the use of the resin as recited above, the second ink-receiving layer having a 60° specular glossiness of at least 60% at the surface can be formed with high efficiency.

Of the resins recited above, the resins preferably used for the second ink-receiving layer are resins having the following physical properties respectively.

As to polyvinyl alcohol, the resinous materials having their saponification degrees in the range of 5 to 60% and their average polymerization degrees in the range of 100 to 2,500 are greatly preferred. In particular, it is advantageous that their melting temperatures be in the range of 100 to 150° C.

As to polyvinyl pyrrolidone, it is especially preferable that the average molecular weight thereof be in the range of $2.2 \times 10^5$ to $2.8-10^6$.

As to water-soluble cellulose, it is preferable that the viscosity thereof be at least 50 cps as a 2% aqueous solution.

As to polyester resin, it is particularly advantageous to use a suspension prepared by dispersing fine particles of polyester resin having an average molecular weight of from $1 \times 10^4$ to $2 \times 10^4$ into a mixture of water and an organic solvent, or water-soluble polyester resin.

As to cellulose acetate, it is preferable that the average acetyl group content therein be from 10 to 60% by weight.

As to acetal resin, it is advantageous to use the resin having an acetalization degree of at least 60%, an acetyl group content of at most 3 mole % and an average polymerization degree of 500 to 1,500.

As to colloidal silica-combined styrene-acrylic copolymer resin, it is advantageous to use a suspension of fine resin particles prepared by copolymerizing styrene and a monomer having an ethylenic unsaturated bond in the presence of colloidal silica. Examples of a monomer having an ethylenic unsaturated bond which can be used therein include acrylic acid esters, such as methyl acrylate, ethyl acrylate, butyl acrylate, 2-ethylhexyl acrylate, lauryl acrylate, 2-hydroxyethyl acrylate and glycidyl acrylate, and methyacrylic acid esters, such as methyl methacrylate, ethyl methacrylate, 2-hydroxyethyl methacrylate, 2-hydroxypropyl methacrylate and glycidyl methacrylate. The appropriate ratio of styrene-acrylic copolymer resin to colloidal silica upon combination is from 10/90 to 90/10 by dry weight.

In the present invention, the surface treatment is carried out after providing on a support the first ink-receiving layer or the second ink-receiving layer, wherein the ink-receiving layer provided on the support is passed through a nip formed between a pair of heated and/or pressure-applied rolls, either of which has a specular surface, so that the ink-receiving layer is brought into contact with the specular surface. Therefore, it is desirable that the resin used for the second ink-receiving layer be a thermoplastic resin. From the viewpoint of preventing the resin transfer from the second ink-receiving layer to the specular surface of the roll, it is especially desirable to use a thermoplastic resin having a glass transition temperature of −10° C. or higher for the second ink-receiving layer. Additionally, the use of such a resin is also desirable for avoiding potential danger of causing adhesion of the recorded side of one recording sheet to the back side of another recording sheet piled thereon.

The especially suitable resin for the second ink-receiving layer is a mixture of polyvinyl alcohol and polyester resins. Although these resins may be mixed in any ratio, the appropriate ratio of polyvinyl alcohol to polyester resin is from 70/30 to 95/5 by weight.

To the second ink-receiving layer, inorganic pigments having various sizes, such as colloidal silica, amorphous silica, silicon oxide, titanium oxide, aluminum oxide, zinc oxide, tin oxide, calcium carbonate, magnesium carbonate, magnesium sulfate, aluminum silicate, magnesium silicate, kaolin, clay and zeolite, and resin powders such as plastic pigment can be added, if needed, provided that the addition thereof does not lower the 60° specular glossiness to below 60%.

In addition to those pigments, the second ink-receiving layer can contain other additives, such as a plasticizer, a pigment dispersing agent, a thickener, a leveling agent, an antifoaming or defoaming agent, a surfactant, a brightening agent, a coloring dye, a coloring pigment, a fixing agent, an antioxidant, a UV absorbent and a waterproof agent.

The ink-receiving layers of the present ink jet recording sheet can be formed using conventional coaters of various kinds, e.g., a blade coater, an air knife coater, a roll coater, a curtain coater, a die coater, a bar coater, a rod blade coater and a gravure coater. The layers coated are dried and solidified by exposure to hot air or infrared rays.

In order to impart much higher gloss to the recording side of ink jet recording sheet, the surface treatment as mentioned above is carried out in the invention. More specifically, in one manner, the first ink-receiving layer dried and solidified on a support is passed through a nip between two rolls either of which has a specular surface so that the ink-receiving layer surface is brought into contact with the specular surface, and then the second ink-receiving layer is coated and dried. In the other manner, the second ink-receiving layer is formed on the first ink-receiving layer, and then subjected to the surface treatment as mentioned above. The surface treatment carried out in the invention does not cause the collapse of pores formed in the first ink-receiving layer because the inorganic particles used therein are primary particles having an average size of 10 to 500 nm.

The rolls used for the foregoing surface treatment include rolls made of various materials, such as a steel roll, a rubber roll and a cotton roll. However, it is necessary to use at least one steel roll having a specular surface. The roll having a specular surface (hereinafter referred to as "a specular roll") means a roll that is made of a metal having very high hardness and has a very smooth surface formed by polishing. On the other hand, a cotton roll and a rubber roll are referred to as "elastic rolls", because their surfaces have elasticity.

As general methods for surface treatment, the calendering treatments referred to as "super calendering" and "soft calendering" respectively are known. These treatments can also be adopted in the present invention. However, the term "surface treatment" used in the invention, namely the treatment of passing an ink-receiving layer through a nip between two rolls either of which has a specular surface so as to contact it with the specular surface, should not be construed as being limited to calendering treatments.

In the surface treatment of the present invention, it is desirable to control the roll surface temperature to the range of 30 to 120° C. The nip pressure (linear pressure) between the rolls, though it can be chosen from the range of 30 to 300 kg/cm, is desirably from 100 to 300 kg/cm. When the calendering is performed under the linear pressure higher than 300 kg/cm, the voids in the ink-receiving layer are reduced to mar the ink absorbency; while the calendering under linear pressure lower than 100 kg/cm cannot impart sufficiently high surface gloss to the recording layer.

The heated roll maybe either a specular roll or an elastic roll. The surface of a specular roll may have any temperature if only the temperature can raise the recording side temperature of the ink jet recording sheet.

The surface treatment in the present invention is carried out by passing an ink jet recording sheet at least once through either a nip between a specular roll and an elastic roll or a nip between a specular roll and a specular roll. Therein, the recording sheet may be passed successively through two or more nips formed by a plurality of rolls to undergo pressing more than once, provided that the recording sheet is passed through nips so that the recording side thereof is always brought into contact with the specular roll surface. In other words, when one of pressing rolls is an elastic roll, such as a rubber roll or a cotton roll, the recording sheet must be passed between them so that the recording side thereof is not brought into contact with the elastic roll surface. This is because the texture of the elastic roll surface tends to be transferred to the recording sheet surface upon contact therewith under pressure, thereby rendering the recording sheet surface rough or corrugated to spoil the appearance of recording sheet. The hardness of an elastic roll has no particular limitation so far as it can ensure enough strength to withstand the pressure from the specular roll, but it is preferably from 80 to 90 degrees.

The ink usable for the present ink jet recording sheet is constituted mainly of dyes for recording images and a dispersion medium or solvent for dispersing the dyes. As such dyes can be used known coloring materials, with examples including direct dye, acid dye, basic dye, reactive dye, food color, disperse dye, oil soluble dye and various kinds of pigments. Examples of a dispersion medium or solvent usable for ink include water and water-soluble organic solvents, such as alcohol and glycol. Any of these solvents can ensure a general dye concentration of 0.1–20 weight % for the ink.

In accordance with the present invention, the ink jet recording sheet can have a thick porous ink-receiving layer, thereby achieving high ink absorbency and great ink receptivity and acquiring excellent recording suitability for color images. Further, the ink jet recording sheet can have high surface gloss (such as 60° surface glossiness of at least 60%) in both background and image-recorded areas, because the high ink absorbency of the present recording sheet can be kept even after receiving surface treatment under high linear pressure, such as calendering. Therefore, the present recording sheet enables the formation of very high-grade full-color images by ink jet recording.

The entire disclosure of all application, patents and publications, cited above and below, and of corresponding Japanese application No. H10-284936, filed Oct. 7, 1998, and Japanese application No. H10-286421, filed Oct. 8, 1998, are hereby incorporated by reference.

The present invention will now be illustrated in more detail by reference to the following examples, but it should be understood that these examples are not to be construed as limiting the scope of the invention in any way. Unless otherwise noted, all "parts" and all "%" are by weight in the following examples and comparative examples.

Additionally, the determination of various physical properties is carried out as follows:

One of the printers used is an ink jet printer, Model BJC-420J (trade name, a product of Canon Inc.), which is referred to as "Printer 1" hereinafter, and the other is an ink jet printer, Model PM700C (trade name, a product of Seiko Epson Corp.), which is referred to as "Printer 2" hereinafter. The 4 kinds of ink, cyan (C) ink, magenta (M) ink, yellow (Y) ink and black (BK) ink, used for these printers are genuine ink products specified by their respective makers.

The coverage of each ink-receiving layer is determined by basis weight measurements according to JIS P8124, wherein the basis weight of a recording paper provided with an ink receiving layer and that of the base paper used therein are measured and the difference between these measured values is calculated. The glossiness is determined by measuring the specular glossiness at the ink-receiving layer surface with a glossimeter, GM-3D (trade name, a product of Murakami Shikisai Kenkyujo), according to JIS Z8741 (incident angle of light: 60°). As to the color densities of recorded images, the reflection densities of cyan (C), magenta (M), yellow (Y) and black (BK) solid areas are measured respectively with a calorimeter, SPM 100 (trade name, a product of GRETAG Limited) The ink absorbency is evaluated by an extent of blur at the boundary between recorded image areas of different colors and an extent of beading.

The extent of blur is judged in the following way: A pattern made up of closely arranged square areas measuring 30 mm×30 mm in size is printed on every recording sheet sample with Printer 1 and Printer 2 each so that one square area solidly colored in blue by the mixture of cyan ink and magenta ink alternates with another square area solidly colored in red by the mixture of magenta ink with yellow ink, and the extent of blur at the boundary between the blue square area and the red square area is evaluated by visual observation according to the three ranks mentioned below;

○: No cissing, no bleeding and no running of ink are observed at the boundaries, namely the image recorded has high-grade quality.

Δ: Some cissing, some bleeding and some running of ink are observed at the boundaries, but the image recorded still retains the recording quality.

X: Cissing, bleeding and running of ink are observed at the boundaries to such an extent as to damage the recording quality.

According to the above criterion, it is required for a high-grade ink jet recording sheet to be graded as at least Δ.

The extent of beading is judged in the following way: Images solidly colored in cyan ink, magenta ink, yellow ink, black ink, blue ink (mixture of cyan and magenta), red ink (mixture of magenta and yellow) and green ink (mixture of cyan and yellow) respectively are printed on each recording sheet sample by means of Printer 1 and Printer 2 each, and the extent of unevenness in the density of each solid image area is evaluated by visual observation according to the following three ranks;

○: No unevenness of color density is observed in the solidly recorded image areas, namely the image recorded has high-grade quality.

Δ: Slight unevenness of color density is observed in the solidly recorded image areas, but the image recorded still retains the recording quality.

X: Unevenness of color density is observed in the solidly recorded image areas such an extent as to damage the recording quality.

According to the above criterion, it is required for a high-grade ink jet recording sheet to be graded as at least Δ.

EXAMPLE 1

Alumina sol was produced according to the method disclosed in Japan Tokkai Hei 8-333115. More specifically, 810 g of ion exchange water and 676 g of isopropanol were placed in a reaction vessel, and heated up to 75° C. Thereto, 306 g of aluminum isopropoxide was added with stirring. The resulting mixture was subjected to hydrolysis for 20 hours at stirring speed of 600 rpm while keeping the temperature at 75–80° C. Then, the isopropanol was distilled away by heating as 400 g of ion exchange water was added. To the thus obtained slurry of hydrated alumina having a solid concentration of 10 weight %, the temperature of which was kept at 95° C., a 10 weight % aqueous solution of amidosulfate as a deflocculant was added in such an amount that 11 millimole of amidosulfate molecules are present per mole of aluminum atoms in boehmite. The deflocculation was carried out for 15 hours at 95° C., and the deflocculation product was concentrated to yield alumina sol having a solid concentration of 21 weight % and a pH value of 4.5.

As a support for an ink jet recording sheet, woodfree paper, NPi Form (having a basis weight of 145 g/m$^2$, made by Nippon Paper Industries Co., Ltd.) was used.

As a coating composition for a first ink-receiving layer, an aqueous dispersion having a concentration of 17% was prepared from 100 parts of the alumina sol produced above, 6.5 parts of polyvinyl alcohol (PVA-117, trade name, a product of Kuraray Co., Ltd.) as binder and 523 parts of water. The aqueous dispersion prepared was coated on the foregoing support so as to have a dry coverage of 30 g/m$^2$ by means of a Mayer bar, and dried for 3 minutes in a 130° C. convection dryer, thereby forming the first ink-receiving layer.

As a coating composition for a second ink-receiving layer, an aqueous dispersion having a concentration of 2% was prepared from 80 parts of polyvinyl alcohol having a saponification degree of 35 mole % and an average polymerization degree of 300, 20 parts of polyester resin having a glass transition temperature of 20° C. (Vylonal MD-1400, a product of Toyobo Co., Ltd.), 2,450 parts of isopropanol and 2,450 parts of water. This coating composition was applied to the first ink-receiving layer so as to have a dry coverage of 0.3 $g/m^2$ by means of a Mayer bar, and dried for 1 minute in a 120° C. convection dryer, thereby producing an ink jet recording sheet.

EXAMPLE 2

The first ink-receiving layer was formed in the same manner as in Example 1. As to the second ink-receiving layer, the coating composition used therefor was an aqueous dispersion having a concentration of 2% and containing 80 parts of polyvinyl alcohol having a saponification degree of 35 mole % and an average polymerization degree of 300, 20 parts of polyester resin having a glass transition temperature of 67° C. (Vylonal MD-1200, a product of Toyobo Co., Ltd.), 2,450 parts of isopropanol and 2,450 parts of water. This aqueous dispersion was applied to the first ink-receiving layer so as to have a dry coverage of 0.3 $g/m^2$ by means of a Mayer bar, and dried for 1 minute in a 120° C. convection dryer, thereby producing an ink jet recording sheet.

EXAMPLE 3

The first ink-receiving layer was formed in the same manner as in Example 1. As to the second ink-receiving layer, the coating composition used therefor was a 1% solution containing 1 part of cellulose acetate (Acetate Flake, a product of Teijin Limited) in 99 parts of acetone. This solution was applied to the first ink-receiving layer so as to have a dry coverage of 0.2 $g/m^2$ by means of a Mayer bar, and dried for 1 minute in a 120° C. convection dryer, thereby producing an ink jet recording sheet.

EXAMPLE 4

The first ink-receiving layer was formed in the same manner as in Example 1. As to the second ink-receiving layer, the coating composition used therefor was a 2% solution containing 10 parts of polyvinyl butyral (KS-1, a product of Sekisui Chemical Co., Ltd.) in the mixture of 245 parts of methanol with 245 parts of water. This solution was applied to the first ink-receiving layer so as to have a dry coverage of 0.2 $g/m^2$ by means of a Mayer bar, and dried for 1 minute in a 120° C. convection dryer, thereby producing an ink jet recording sheet.

EXAMPLE 5

The first ink-receiving layer was formed in the same manner as in Example 1. For the second ink-receiving layer, a coating composition having a concentration of 7% was prepared from 85 parts of polyvinyl pyrrolidone (K-90, a product of ISP Inc.), 15 parts of melanine resin (Sumirez Resin 613, a product of Sumitomo Chemical Industries Co., Ltd.) and 1,330 parts of water. This composition was applied to the first ink-receiving layer so as to have a dry coverage of 2 $g/m^2$ by means of a Mayer bar, and dried for 1 minute in a 120° C. convection dryer, thereby producing an ink jet recording sheet.

EXAMPLE 6

The first ink-receiving layer was formed in the same manner as in Example 1. For the second ink-receiving layer, a coating composition having a concentration of 1% was prepared by diluting colloidal silica-combined styrene-acrylic resin (Mobineal 8050, a product of Clariant Polymer K.K. ) with water. This composition was applied to the first ink-receiving layer so as to have a dry coverage of 0.2 $g/m^2$ by means of a Mayer bar, and dried for 1 minute in a 120° C. convection dryer, thereby producing an ink jet recording sheet.

Comparative Example 1

The same coating composition as used for the first ink-receiving layer in Example 1 was coated on the same woodfree paper, NPi Form, as used in Example 1 so as to have a dry coverage of 20 $g/m^2$, and dried by pressing the coated layer surface against a specular drum heated at about 100° C. (the method referred to as "cast method" in the field of papermaking) to prepare an ink jet recording sheet.

Comparative Example 2

The same coating composition as used for the first ink-receiving layer in Example 1 was coated on the same woodfree paper, NPi Form, as used in Example 1 so as to have a dry coverage of 30 $g/m^2$ by means of a Mayer bar, and dried in the same manner as in Example 1 to produce an ink jet recording sheet.

Comparative Example 3

The first ink-receiving layer was formed in the same manner as in Example 1. As a coating composition for the second ink-receiving layer was prepared a 3% aqueous solution of polyvinyl alcohol (B-24, a product of Shin-etsu Chemical Co., Ltd.). This coating solution was applied to the first ink-receiving layer so as to have a dry coverage of 5 $g/m^2$ by means of a Mayer bar, and dried for 1 minute in a 120° C. convection dryer, thereby producing an ink jet recording sheet.

Comparative Example 4

The first ink-receiving layer was formed in the same manner as in Example 1. As a coating composition for the second ink-receiving layer was prepared a 0.1% aqueous solution constituted of 1 part of polyvinyl alcohol (B-04, a product of Shin-etsu Chemical Co., Ltd.) and 999 parts of water. This solution was applied to the first ink-receiving layer so as to have a dry coverage of 0.02 $g/m^2$ by means of a Mayer bar, and dried for 1 minute in a 120° C. convection dryer, thereby producing an ink jet recording sheet.

The evaluation results of the ink jet recording sheets prepared in Examples and Comparative Examples respectively are set forth in Table 1.

TABLE 1

| | Glossiness (%) at the surface | | Ink Absorbency | | Color Densities of Recorded Images | | | | | | | |
|---|---|---|---|---|---|---|---|---|---|---|---|---|
| | back- | image | Printer | Printer | Printer 1 | | | | Printer 2 | | | |
| | ground | area | 1 | 2 | Y | M | C | BK | Y | M | C | BK |
| Example 1 | 14 | 71 | ○ | ○ | 1.50 | 1.64 | 1.94 | 1.77 | 1.89 | 1.77 | 2.06 | 2.07 |
| Example 2 | 83 | 79 | ○ | ○ | 1.56 | 1.67 | 1.97 | 1.80 | 1.84 | 1.74 | 2.12 | 2.01 |
| Example 3 | 90 | 87 | ○ | ○ | 1.54 | 1.63 | 1.88 | 1.73 | 1.69 | 1.67 | 1.93 | 2.12 |
| Example 4 | 62 | 60 | ○ | ○ | 1.55 | 1.66 | 1.95 | 1.78 | 1.75 | 1.68 | 2.01 | 1.94 |
| Example 5 | 80 | 85 | Δ | Δ | 1.71 | 2.19 | 2.72 | 2.36 | 1.91 | 1.92 | 1.76 | 1.98 |
| Example 6 | 85 | 87 | ○ | ○ | 1.61 | 1.73 | 1.99 | 1.85 | 1.88 | 1.78 | 2.11 | 2.05 |
| Comparative Example 1 | 54 | 50 | × | ○ | 1.32 | 1.53 | 1.92 | 1.73 | 1.48 | 1.45 | 2.01 | 1.94 |
| Comparative Example 2 | 37 | 26 | ○ | ○ | 1.31 | 1.48 | 1.73 | 1.60 | 1.45 | 1.50 | 1.82 | 1.69 |
| Comparative Example 3 | 93 | — | × | × | — | — | — | — | — | — | — | — |
| Comparative Example 4 | 48 | 52 | ○ | ○ | 1.64 | 1.80 | 2.11 | 1.91 | 1.84 | 1.74 | 2.11 | 2.06 |

As can be seen from Table 1, all the recording sheets prepared in Examples 1 to 6 had excellent ink absorbency, and color images of high densities were recorded thereon with both ink jet printers. Further, they showed glossiness higher than 60% at the surface of background area, and the images recorded thereon gave a high-grade feeling.

On the other hand, the recording sheet prepared in Comparative Example 1 was inferior in ink absorbency and the color densities of images recorded thereon were low although it had rather high glossiness at the surface of background area. In other words, it was unsuccessful in ensuring high-grade quality for the images recorded thereon. The recording sheet prepared in Comparative Example 2, though it had excellent ink absorbency, showed low glossiness at the surface of background area and a drop in glossiness at the image-recorded area, so it failed in giving high-grade quality to the images recorded thereon. The recording sheet prepared in Comparative Example 3 had very low ink absorbency although the glossiness at the surface of background area was very high, and so failed in providing recorded images of satisfactory quality. The likely reason therefor is that the second ink-receiving layer formed therein functioned as a barrier to ink absorption. The recording sheet prepared in Comparative Example 4 had excellent ink absorbency and ensured high color densities in the images recorded thereon, but the glossiness at the surface of both background and recorded image areas was low. Therefore, it was unsuccessful in providing recorded images of high-grade quality.

These results have proved that the recording sheets prepared in accordance with the invention are used to advantage for ink jet recording.

EXAMPLE 7

The recording sheet prepared in the same manner as in Example 1 was subjected to calendering treatment to obtain an ink jet recording sheet. For the calendering treatment, a test calendering apparatus (made by Yuri Roll Kikai K.K.) was used, wherein the recording sheet was passed through the nip between a steel roll having a specular surface and a surface temperature of 50° C. and a cotton roll (hardness: 85 degrees) at a treatment speed of 15 m/min under a linear pressure of 150 kg/cm so that the recording side of recording sheet was brought into contact with the specular surface of steel roll.

EXAMPLE 8

The first ink-receiving layer was formed in the same manner as in Example 1, and then subjected to surface treatment under the same calendering condition as adopted in Example 7. On the thus surface-treated first ink-receiving layer, the same coating composition as used for the second ink-receiving layer in Example 1 was coated and dried in the same manners as in Example 1 to obtain an ink jet recording sheet.

EXAMPLE 9

The recording sheet prepared in the same manner as in Example 2 was subjected to calendering treatment to obtain an ink jet recording sheet. Herein, the calendering treatment was carried out with the same calendering apparatus under the same operating conditions as in Example 7, except that the surface temperature of the steel roll was changed to 70° C. and the linear pressure between the rolls was changed to 100 kg/cm.

EXAMPLE 10

An ink jet recording sheet was prepared in the same manner as in Example 3, except that the first ink-receiving layer provided on the paper support was subjected to calendering treatment before the aqueous dispersion for the second ink-receiving layer was applied thereto. Herein, the calendering treatment was carried out with the same calendering apparatus under the same operating conditions as in Example 7, except that the linear pressure between the rolls was changed to 250 kg/cm and the surface temperature of the steel roll was changed to 100° C.

EXAMPLE 11

The recording sheet prepared in the same manner as in Example 4 was subjected to calendering treatment to obtain an ink jet recording sheet. Herein, the calendering treatment was carried out with the same calendering apparatus under the same operating conditions as in Example 7, except that the linear pressure between the rolls was changed to 250 kg/cm.

EXAMPLE 12

The recording sheet prepared in the same manner as in Example 5 was subjected to calendering treatment to obtain an ink jet recording sheet. Herein, the calendering treatment was carried out with the same calendering apparatus under the same operating conditions as in Example 7, except that the surface temperature of the steel roll was changed to 40° C. and the linear pressure between the rolls was changed to 250 kg/cm.

Comparative Example 5

The same coating composition as used for the first ink-receiving layer in Example 7 was coated on the same woodfree paper, NPi Form, as used in Example 7 so as to have a dry coverage of 30 g/m$^2$, and then subjected to the same calendering treatment as carried out in Example 11 to prepare an ink jet recording sheet.

Comparative Example 6

The first ink-receiving layer was formed in the same manner as in Example 7. As a coating composition for the second ink-receiving layer, a 0.1% aqueous solution constituted of 3 part of polyvinyl alcohol (B-04, a product of Shin-etsu Chemical Co., Ltd.) and 997 parts of water was prepared. This solution was applied to the first ink-receiving layer so as to have a dry coverage of 0.02 g/m$^2$ by means of a Mayer bar, and then dried for 1 minute in a 120° C. convection dryer, thereby producing an ink jet recording sheet.

Comparative Example 7

Woodfree paper, NPi Form (having a basis weight of 145 g/m$^2$, made by Nippon Paper Industries Co., Ltd.) was used as support for an ink jet recording sheet, and as coating composition for a first ink-receiving layer was used an aqueous dispersion having a solids concentration of 30% which was constituted of 100 parts of amorphous silica (a product of Fuji Silysia Chemiccal Co., Ltd.) having an average secondary particle size of 6 μm, measured with a Coulter counter, 25 parts of polyvinyl alcohol (PVA-117, trade name, a product of Kuraray Co., Ltd.) as water-soluble binder and 292 parts of water. This aqueous dispersion was coated on the foregoing support so as to have a dry coverage of 25 g/m$^2$ by means of a Mayer bar, dried for 3 minutes in a 130° C. convection dryer, and then subjected to the same calendering treatment as in Example 7, except that the linear pressure was changed to 200 kg/cm, thereby forming the first ink-receiving layer.

For the second ink-receiving layer, a coating composition having a concentration of 7% was prepared from 85 parts of polyvinyl pyrrolidone (K-90, a product of ISP Inc.), 15 parts of melanine resin (Sumirez Resin 613, a product of Sumitomo Chemical Industries Co., Ltd.) and 1,330 parts of water. This composition was applied to the first ink-receiving layer so as to have a dry coverage of 2 g/m$^2$ by means of a Mayer bar, and dried for 1 minute in a 120° C. convection dryer, thereby producing an ink jet recording sheet.

The evaluation results of the ink jet recording sheets prepared in Examples 7 to 12 and Comparative Examples 5 to 8 respectively are set forth in Table 2.

TABLE 2

| | Calendering condition | | Glossiness (%) at the surface | | Ink absorbency | | Color Densities of Recorded Images | | | | | | | |
|---|---|---|---|---|---|---|---|---|---|---|---|---|---|---|
| | | | | | | | Printer 1 | | | | Printer 2 | | | |
| | surface temperature | linear pressure (kg/cm) | background | image area | printer 1 | printer 2 | Y | M | C | BK | Y | M | C | BK |
| Example 7 | 50° C. | 150 | 110 | 98 | ○ | ○ | 1.59 | 1.69 | 2.03 | 1.81 | 1.83 | 1.84 | 2.17 | 2.04 |
| Example 8 | 50° C. | 150 | 88 | 95 | ○ | ○ | 1.69 | 1.72 | 2.08 | 1.89 | 1.81 | 1.86 | 2.25 | 2.17 |
| Example 9 | 70° C. | 100 | 114 | 99 | ○ | ○ | 1.65 | 1.78 | 2.13 | 1.87 | 1.85 | 1.86 | 2.23 | 2.10 |
| Example 10 | 100° C. | 250 | 96 | 92 | ○ | ○ | 1.52 | 1.65 | 1.85 | 1.74 | 1.71 | 1.65 | 1.94 | 2.08 |
| Example 11 | 50° C. | 250 | 82 | 76 | ○ | ○ | 1.59 | 1.72 | 2.05 | 1.82 | 1.87 | 1.74 | 2.18 | 2.07 |
| Example 12 | 40° C. | 250 | 97 | 94 | Δ | Δ | 1.66 | 1.98 | 2.45 | 2.11 | 1.92 | 1.88 | 2.01 | 2.08 |
| Compar. Example 5 | 50° C. | 250 | 50 | 63 | ○ | ○ | 1.57 | 1.74 | 2.08 | 1.89 | 1.88 | 1.84 | 2.22 | 2.06 |
| Compar. Example 6 | — | — | 46 | 52 | ○ | ○ | 1.64 | 1.80 | 2.11 | 1.91 | 1.84 | 1.74 | 2.11 | 2.06 |
| Compar. Example 7 | 50° C. | 200 | 17 | 20 | × | Δ | 1.16 | 1.37 | 1.34 | 1.39 | 1.59 | 1.55 | 1.70 | 1.74 |

As can be seen from Table 2, the ink jet recording sheets prepared in Examples 7 to 12 had almost no recognizable deterioration in ink absorbency due to calendering treatment, and showed satisfactory ink absorbency. Further, the images recorded on every recording sheet according to the invention by the use of ink jet printers had excellent quality and gave a high-grade feeling because the present sheet had a glossiness of at least 80% at the background surface. In the recording sheets prepared in Examples 7 to 9, the glossiness at the image area surface showed a decrease of about 10–15% from the glossiness at the background surface. As the surface gloss of each recording sheet itself was very high, however, the images recorded thereon gave a high-grade feeling as far as visual observation was made.

To mention in detail, the calendering treatment in Example 7 was carried out after forming the second ink-receiving layer on the first ink-receiving layer; while the calendering treatment in Example 8 was carried out after forming the first ink-receiving layer on the paper support. As a result thereof, it was confirmed that both cases could achieve excellent recording properties on almost the same level. Further, it was confirmed from the results of Examples 8 and 10 that, as far as the calendering treatment was given to the first ink-receiving layer before forming thereon the second ink-receiving layer, the ink jet recording of high quality could be performed even when different compositions were used for the second ink-receiving layer.

On the other hand, the recording sheets prepared in Comparative Examples 5 and 6 had low glossiness at the background surface although they had recorded-image areas with high surface gloss and high color densities by ink jet recording, and so they failed in providing recorded images of high-grade feeling.

In Comparative Example 7 wherein amorphous silica particles were used in the first ink-receiving layer, not only the surface gloss of the recording sheet were very low, but also the ink absorbency thereof was not good, compared with the recording sheets using hydrated alumina particles in the first ink-receiving layer as in Examples 7 to 12. As a reason for the inferiority in ink absorbency, it is supposed that the pores inside the ink-receiving layer are collapsed by calendering.

From these results, it was also confirmed that, when the particles having a large size (such as amorphous silica) were used in the first ink-receiving layer, the coating composition for the second ink-receiving layer was absorbed rapidly into the first ink receiving layer to reduce its glossiness-providing function to a half. Even when the second ink-receiving layer had some glossiness at the surface, the glossiness was scarcely comparable to the specular gloss of photographic paper surface, but it was equivalent only to that of matted photographic paper surface. And the calendering treatment produced no considerable improvement on this point. In other words, it was ascertained that when the finer pigment is used in an ink-receiving layer in accordance with the present invention it is easier to provide a glossy layer on the ink-receiving layer and the glossy layer can get higher glossiness by calendering treatment.

The aforementioned results also have proved the usefulness of ink jet recording sheets prepared in accordance with the present invention.

What is claimed is:

1. An ink jet recording sheet having on a sheet support a first porous ink-receiving layer comprising inorganic particles and a binder resin and, on the first ink-receiving layer, a second ink-receiving layer consisting essentially of a resin capable of forming a glossy layer; said inorganic particles having an average particle size of from 10 to 500 nm, said first ink-receiving layer having a coverage of from 5 to 50 g/m$^2$ on a dry solids basis, and said second ink-receiving layer being porous and having a coverage of from 0.1 to 2.0 g/m$^2$ on a dry solids basis and a 60° specular glossiness of at least 60% at the surface.

2. An ink jet recording sheet having on a sheet support a first porous ink-receiving layer comprising inorganic particles and a binder resin and, on the first ink-receiving layer, a second ink-receiving layer comprising a resin capable of forming a glossy layer; said inorganic particles having an average particle size of from 10 to 500 nm, said first ink-receiving layer having a coverage of from 5 to 50 g/m$^2$ on a dry solids basis, and said second ink-receiving layer being porous and having a coverage of from 0.1 to 1.0 g/m$^2$ on a dry solids basis and a 60° specular glossiness of at least 60% at the surface.

3. An ink jet recording sheet according to claim 1, wherein the first ink-receiving layer contains pores formed among said inorganic particles and having their radii in the range of 1 to 500 nm and an average pore radius of no greater than 100 nm.

4. An ink jet recording sheet according to claim 1, wherein the coverage of the first ink-receiving layer is from 20 to 50 g/m$^2$ on a dry solids basis.

5. An ink jet recording sheet according to claim 1, wherein the binder resin in the first ink-receiving layer is a water-soluble resin.

6. An ink jet recording sheet according to claim 1, wherein the ratio of inorganic particles to binder resin in the first ink-receiving layer is from 97/3 to 70/30 by weight on a dry solids basis.

7. An ink jet recording sheet according to claim 1, wherein the first ink-receiving layer is a layer which is transparent.

8. An ink jet recording sheet according to claim 1, wherein the resin comprised in the second ink-receiving layer is at least one resin selected from a group consisting of polyvinyl alcohol, polyvinyl pyrrolidone, water-soluble cellulose, polyvinyl acetal, polyester, cellulose acetate and colloidal silica-combined styrene-acrylic copolymer resin.

9. An ink jet recording sheet according to claim 8, wherein the resin of said second ink-receiving layer is polyvinyl alcohol having a saponification degree of from 5 to 60% and an average polymerization degree of from 100 to 2,500.

10. An ink jet recording sheet according to claim 8, wherein the resin of said second ink-receiving layer is a mixture of polyvinyl alcohol and polyester.

11. An ink jet recording sheet according to claim 10, wherein the polyvinyl alcohol and the polyester is mixed in a ratio of from 70/30 to 95/5 by weight.

12. An ink jet recording sheet according to claim 4, wherein either the first ink-receiving layer or the second ink-receiving layer has a specular surface acquired by a surface treatment.

13. An ink jet recording sheet according to claim 12, wherein the surface treatment is a calendering treatment.

14. A method of producing an ink jet recording sheet according to claim 10; comprising providing on a sheet support a first porous ink-receiving layer comprising inorganic particles having an average particle size of from 10 to 500 nm and a binder resin at a dry coverage of 20 to 50 g/m$^2$, and further comprising passing either the first ink-receiving layer provided on the support or the second ink-receiving layer provided on the first ink-receiving layer through a nip between two heated and/or pressure applied rolls either of which has a specular surface as the surface of the ink-receiving layer is brought into contact with the specular surface of the roll.

15. A method of producing an ink jet recording sheet in accordance with claim 14, wherein the surface temperature of the roll having a specular surface is from 30 C. to 120 C. and/or the pressure applied between the rolls is from 30 to 300 kg/cm.

16. An ink-jet recording sheet according to claim 1, wherein said first porous ink-receiving layer is prepared by applying a coating composition to said support, wherein said coating composition contains an alumina sol containing hydrated alumina particles of boehmite having an average particle size of 10–500 mn, and wherein said sol exhibits a pH of 2–6 at a solids concentration of 15–30 wt %.

17. An ink-jet recording sheet according to claim 6, wherein the ratio of inorganic particles to binder resin in the first ink-receiving layer is 95/5 to 85/15 by weight.

18. An ink-jet recording sheet according to claim 1, wherein said second ink-receiving layer has a coverage of 0.1–1.0 $g/m^2$ on a dry solid basis.

19. An ink-jet recording sheet according to claim 1, wherein said first porous ink-receiving layer is applied to said support as a coating composition containing a metal oxide sol.

20. An ink-jet recording sheet according to claim 19, wherein said metal oxide sol is a silica sol, an alumina sol, a zirconia sol or a titania sol.

21. An ink-jet recording sheet according to claim 1, wherein the binder resin of said first porous ink-receiving layer is selected from polyvinyl alcohol, polyvinyl pyrrolidone, water-soluble cellulose, conjugate diene polymers, acrylic polymers, and vinyl polymers.

22. An ink-jet recording sheet according to claim 1, wherein said first porous ink-receiving layer further comprises a pigment dispersing agent, a coupling agent, a gelling agent, a thickener, a leveling agent, an antifoaming or defoaming agent, a surfactant, a brightening agent, a coloring dye, a fixing agent, an antioxidant, a UV absorbent and/or a waterproof agent.

23. An ink-jet recording sheet according to claim 1, wherein said resin of said second ink-receiving layer is selected from polyvinyl alcohol, polyvinyl pyrrolidone, water-soluble cellulose, polyester, cellulose acetate, acetal resin and colloidal silica-combined styrene-acrylic copolymer resin, and combinations thereof.

* * * * *